Patented Nov. 23, 1937

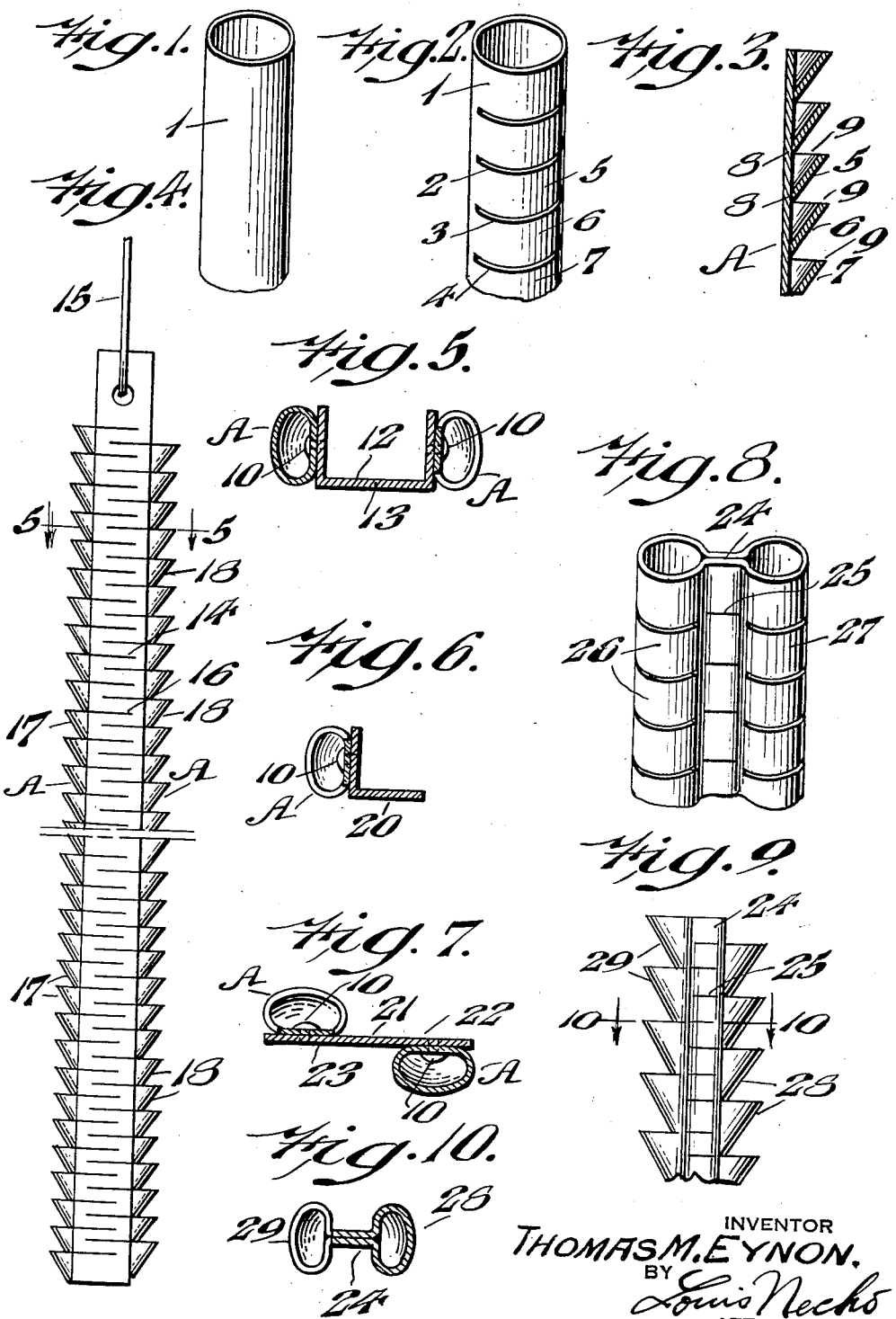

2,099,803

UNITED STATES PATENT OFFICE 2,099,803

METHOD FOR MAKING GAUGES

Thomas M. Eynon, Philadelphia, Pa.

Application March 5, 1937, Serial No. 129,123

2 Claims. (Cl. 29—163.5)

My invention relates to a new and useful method of making a gauge of the type used in measuring the liquid contents of reservoirs by plumbing or sounding the depth of the liquid in said tank or reservoir. Devices of this character have generally consisted of a calibrated rod which is inserted into the tank until the lower end thereof touches bottom, whereupon it is raised and the reading is taken according to the height of the mark left on such rod by the liquid being measured. Such measuring rods, if made from impervious material, are difficult if not impossible to read due to the fact that the liquid, such as water, gasoline, or the like, fails to leave a legible mark. If such rods are made of pervious material, the reading taken is inaccurate due to the "running" of the liquid being measured on such rod by absorption, adhesion or capillary action. In order to overcome this difficulty it has heretofore been proposed to attach to a measuring rod, having the desired calibrations thereon, a series of pockets or cup-shaped elements which are filled with the liquid being measured when the rod is inserted into the liquid according to the height of said liquid, thus constituting proof positive of the exact height of the liquid in a given tank. Such gauges have never attained wide commercial, practical or successful use due to the relatively large additional expense involved in making the pockets referred to and attaching them to the rod, particularly in view of the necessity of extreme accuracy in the spacing of the pockets on the measuring rod.

It is therefore the primary object of my invention to devise a novel method of producing a gauge of this character, that is, one which is provided with pockets for bringing up positive proof of the height of the liquid, and in which the necessary extreme degree of accuracy is attained, all of this being accomplished at the same or less expense than has heretofore been possible.

The exact construction and method of accomplishing my invention will be more clearly set forth in the following specification and the accompanying drawing in which;

Fig. 1 represents a perspective view of a tubular element from which my novel gauge is made.

Fig. 2 represents the first step in the formation of my gauge.

Fig. 3 represents a vertical, sectional view showing the second or last step employed in making my novel gauge.

Fig. 4 represents a front elevation of a gauge provided with a pair of staggered gauges of the type shown in Fig. 3 associated with a calibrated rod.

Fig. 5 represents, on a slightly enlarged scale, a section on line 5—5 of Fig. 4.

Figs. 6 and 7 represent views similar to Fig. 5 showing modified arrangements.

Fig. 8 represents a view in perspective showing the first step in the making of a modified form of my invention.

Fig. 9 represents a view similar to Fig. 3 and being a vertical section of said modified form.

Fig. 10 represents a section on line 10—10 of Fig. 9.

Referring to the drawing in which like reference characters represent like parts and more particularly to Figs. 1 to 3, it will be seen that I begin with a tubular section 1 of the desired length and diameter and which is preferably made of a non-corrosive metal. I then mark off the tubular section 1 into predetermined spaces representing scale calibrations or graduations in inches, feet or fractions thereof, or any other desired linear measurement and cut the tubular section 1 at the places designated, the cut being about semi-circular as shown at 2, 3, 4, etc. in Fig. 2. This results in the intermediate semi-cylindrical and half-detached bands 5, 6, 7, etc. I then press the bottom end (as viewed in Figs. 1 to 3) of each of the bands 5, 6 and 7 against the rear juxtaposed wall of the tubular section 1 as best shown at 8 in Fig. 3. This keeps the upper edge of the bands 5, 6, 7, etc. spaced from the rear part of the cylindrical wall of the tubing 1 and forms a series of pockets 9 which are adapted to receive and hold liquid introduced thereinto. The operation of flattening the bottom ends of the bands 5, 6, 7, etc. results in completely flattening the tubular section 1 except for the angularly disposed walls of the bands 5, 6, 7, etc. which constitute the pockets 9. The entire structure, as seen in Fig. 3, and for the purpose of designation, is marked A, is then suitably secured by the nail 10, or by soldering, or otherwise, to the opposite sides of the channel 12 on the face 13 of which are suitable calibrations 14. As will be seen from Fig. 4, the oppositely disposed pocket members A are mounted on the opposite sides of the channel 12 in staggered relation so that the top of one pocket on the right hand side, as viewed in Fig. 4, will register with one marking or graduation and the top of the corresponding pocket on the left hand side (also as viewed in Fig. 4) will register with the next succeeding graduation. To the top of the channel 12 is hinged in foldable manner a suitable handle 15 which, when the device is not in use, folds flat against the channel 12. In actual use the operator unfolds the handle 15 to the position shown in Fig. 4 and introduces the gauge seen in Fig. 4 through the opening in the top of the tank into the tank until the lower edge of the gauge hits the bottom of the tank. The gauge is then drawn by up means of the handle 15 and the presence of the liquid in a pocket on the right or on the left hand side of the channel 12 will indicate that the height of the liquid in the tank corresponds to or equals the corresponding mark with which the full pocket registers. Thus, assuming the graduation 16 to designate ten feet, and assuming the corresponding pocket 17 is full of the liquid, and that the opposite pocket 18 is empty, it will follow that the height of the liquid is ten feet. It is obvious that by making the pockets smaller and of a thin metal it is possible to arrange them evenly or in staggered relation in much closer order thus affording accurate reading.

In Fig. 6 I have shown the pocket member A as attached to one side of an L with the markings 14 on the side 20. In Fig. 7 I have shown two pocket members A attached to the opposite sides of an upright 21, the graduations for the oppositely placed pocket members A being at the points 22 and 23, respectively.

In Fig. 8 I have shown a modified form of my invention in which I use a somewhat larger tubular section similar to that shown in Fig. 1 and which I first flatten along the center as at 24 and provide with suitable graduations 25. I then cut the remaining oppositely disposed tubular members 26 and 27, as shown in Fig. 2, and depress the bottom ends of the bands intervening any two cuts as set forth in connection with Fig. 3 to produce the oppositely disposed pockets 28 and 29 shown in Figs. 9 and 10. By this construction I dispense with the necessity of any extraneous support as the channel, or L, or other support 21, shown in Figs. 5, 6 and 7. It is of course understood that the graduations 25 are impressed on the opposite faces of the flattened portion 24 so that the gauge may be read from either side.

It will thus be seen that by my novel method and construction I am enabled to produce by mass production methods an accurate gauge which embodies the pocket or the bucket principle for holding an amount of liquid accurately determining the level, and one which is not subject to the climbing, or running, or shrinkage of the liquid, or its entire evaporation before a reading can be had. It will further be seen that the construction is extremely inexpensive particularly when the structures shown in Fig. 3 or in Fig. 9 are utilized independently of any other support either by the attachment thereto of the hinged handle 15, or by making it long enough to reach from the top to the bottom of the tank or reservoir to be measured. A piece of copper tubing long enough for the purpose can be had at very nominal cost and the cutting and bending can be done by very simple and inexpensive operations. The scale markings or graduations can, of course, be impressed or otherwise inscribed on the pocket walls or on the flat surface or any other suitable part where they can be associated with the presence of liquid in the various pockets formed.

With respect to the modified form shown in Fig. 8 I want to point out that it is within the scope of my invention to take the tubular section 1 shown in Fig. 1 and flatten one longitudinal edge thereof to produce a flattened calibrated portion 24 and then to cut and bend the remainder of the tubular portion to form the pockets, thus utilizing the method employed in the production of the device shown in Fig. 8 for the production of a single instead of a double sided gauge.

I want to point out that my invention is not limited to the specific steps of first marking and then cutting, or first cutting and then bending, since my invention really resides in the making of the pockets as an integral part of the tubing and, if it is found advisable to bend one wall of the tube against the opposite wall at intervals and then cut at intermediate intervals with the markings applied before or after the bending or the cutting, the same can be done without departing from the scope or spirit of my invention.

Having thus described my invention, what I claim as new and desire to secure by Letters Patent is:

1. The method of making a gauge which consists in taking a piece of tubing, marking off on said tubing the desired linear calibrations, cutting said tubing along said calibrations to form partly detached bands and bending one edge of each of said bands against the opposite wall of said tubing to form pockets all facing in the same direction adapted to receive and retain the liquid.

2. The method of making a gauge which consists in cutting a piece of tubing at predetermined points to produce partly detached bands of predetermined widths and bending one edge of each of said bands against the opposite wall of said tubing to form pockets all facing in the same direction adapted to receive and retain the liquid.

THOMAS M. EYNON.